(12) United States Patent
Stolze et al.

(10) Patent No.: US 11,675,809 B2
(45) Date of Patent: Jun. 13, 2023

(54) REPLICATING DATA CHANGES USING MULTIPLE STORAGE DEVICES AND TRACKING RECORDS OF PENDING DATA CHANGES STORED ON THE STORAGE DEVICES

(71) Applicant: International Business Machines Corporation, Armonk, NY (US)

(72) Inventors: Knut Stolze, Hummelshain (DE); Reinhold Geiselhart, Rottenburg-Ergenzingen (DE); Felix Beier, Haigerloch (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 17/189,648

(22) Filed: Mar. 2, 2021

(65) Prior Publication Data
US 2022/0284033 A1  Sep. 8, 2022

(51) Int. Cl.
*G06F 16/27* (2019.01)
*G06F 16/11* (2019.01)
(Continued)

(52) U.S. Cl.
CPC ............ *G06F 16/27* (2019.01); *G06F 16/113* (2019.01); *G06F 16/2282* (2019.01); *G06F 16/2358* (2019.01); *G06F 16/2379* (2019.01)

(58) Field of Classification Search
CPC .............................. G06F 16/27; G06F 16/2358
See application file for complete search history.

(56) References Cited

U.S. PATENT DOCUMENTS

| 6,029,178 A | 2/2000 | Martin |
|---|---|---|
| 7,321,904 B2 | 1/2008 | Holenstein |

(Continued)

FOREIGN PATENT DOCUMENTS

| CA | 1090419 A | 11/1980 |
|---|---|---|
| CA | 2459934 A1 | 3/2003 |

(Continued)

OTHER PUBLICATIONS

"Replicating Data Changes of a Source Database in a Target Database Using Data Change Records and Runtime Statistics of the Source Database", U.S. Appl. No. 17/189,671, filed Mar. 2, 2021, 53 pages.

(Continued)

*Primary Examiner* — Robert W Beausoliel, Jr.
*Assistant Examiner* — Pedro J Santos
(74) *Attorney, Agent, or Firm* — Edward J. Wixted, III

(57) ABSTRACT

Methods, computer program products, and/or systems are provided that perform the following operations: generating log files while performing data changes of a source database system table; storing the log files on a first memory device having a first access time; archiving a part of the log files from the first memory device on a second memory device having a second access time, the second access time being higher than the first access time; tracking a second number of pending data changes, the pending data changes being data changes of the records of data change of log files archived on the second memory device which are not yet replicated in a target database system table; selecting a type of data replication from a first type of data replication and a second type of data replication based on the second number; and replicating the data changes in the target database system table.

17 Claims, 8 Drawing Sheets

(51) Int. Cl.
*G06F 16/23* (2019.01)
*G06F 16/22* (2019.01)

(56) References Cited

U.S. PATENT DOCUMENTS

| | | | |
|---|---|---|---|
| 8,121,978 | B2 | 2/2012 | Wiss |
| 8,996,458 | B2 | 3/2015 | Shang |
| 9,442,995 | B2 | 9/2016 | Pareek |
| 9,659,077 | B2 | 5/2017 | Chen |
| 9,672,126 | B2 | 6/2017 | Dewall |
| 10,078,556 | B2 | 9/2018 | Clare |
| 10,275,507 | B2 | 4/2019 | Hrle |
| 10,540,346 | B2 | 1/2020 | Martin |
| 10,657,128 | B2 | 5/2020 | Beier |
| 10,671,642 | B2 | 6/2020 | Brodt |
| 10,698,883 | B2 | 6/2020 | Beier |
| 11,475,043 | B2 | 10/2022 | Butterstein |
| 2005/0193024 | A1 | 9/2005 | Beyer |
| 2009/0037422 | A1 | 2/2009 | Wong |
| 2012/0054155 | A1 | 3/2012 | Darcy |
| 2012/0143825 | A1 | 6/2012 | Boehm |
| 2013/0159249 | A1 | 6/2013 | Dewall |
| 2013/0318044 | A1 | 11/2013 | Pareek |
| 2014/0172794 | A1* | 6/2014 | Bartholoma ............ G06F 16/27 707/634 |
| 2015/0199375 | A1* | 7/2015 | Prahlad ................. G06F 3/0604 707/610 |
| 2016/0077917 | A1 | 3/2016 | Battepati |
| 2017/0060695 | A1 | 3/2017 | Clare |
| 2017/0147672 | A1 | 5/2017 | Arnold |
| 2017/0161348 | A1* | 6/2017 | Araki .................... G06F 16/951 |
| 2017/0177689 | A1* | 6/2017 | Bonnell ............. G06F 16/2358 |
| 2017/0300391 | A1 | 10/2017 | Namburi |
| 2018/0075059 | A1 | 3/2018 | Chen |
| 2018/0081931 | A1 | 3/2018 | Quakkelaar |
| 2018/0253483 | A1 | 9/2018 | Lee |
| 2019/0163370 | A1 | 5/2019 | Sure |
| 2020/0026714 | A1 | 1/2020 | Brodt |
| 2020/0034365 | A1 | 1/2020 | Martin |
| 2020/0151195 | A1 | 5/2020 | Brodt |
| 2020/0364185 | A1 | 11/2020 | Beier |
| 2020/0364239 | A1 | 11/2020 | Kumar |
| 2022/0156277 | A1* | 5/2022 | Beier .................. G06F 16/2386 |
| 2022/0222271 | A1 | 7/2022 | Stolze |

FOREIGN PATENT DOCUMENTS

| | | |
|---|---|---|
| CA | 2271444 C | 11/2005 |
| CN | 106294713 A | 1/2017 |
| CN | 107004010 A | 8/2017 |
| CN | 108319602 A | 7/2018 |
| CN | 110795508 A | 2/2020 |

OTHER PUBLICATIONS

IBM, "List of IBM Patents or Patent Applications Treated as Related", Appendix P, 2 pages, dated Mar. 4, 2021.
"Algorithms for Recovery and Isolation Exploiting Semantics", Wikipedia, This page was last edited on Dec. 5, 2019, 4 pages.
"Data replication", Data—AI—Analytics Reference Architecture, GitHub, downloaded from the Internet on Jan. 6, 2021, 15 pages, <https://ibm-cloud-architecture.github.io/refarch-data-ai-analytics/data/data-replication/>.
"Data Synchronization in a Data Analysis System", U.S. Appl. No. 17/097,848, filed Nov. 13, 2020, 27 pages.
"Dmrefresh—Refresh subscription," IBM, accessed Mar. 1, 2021, 2 pages., <https://www.ibm.com/support/knowledgecenter/en/SSTRGZ_11.4.0/com.IBM.cdedoc.mysql.doc/refs/dmrefresh.html>.
"Dynamic Selection of Synchronization Update Path", U.S. Appl. No. 17/016,314, filed Sep. 9, 2020, 36 pages.
"Reinforcement learning", Wikipedia, This page was last edited on Jan. 3, 2021, 13 pages.
"TimesTen In-Memory Database Replication Guide", Oracle Help Center, downloaded from the Internet on Jan. 7, 2021, 12 pages, <https://docs.oracle.com/database/121/TTREP/setup.htm#TTREP400>.
Ballard et al., "Smarter Business Dynamic Information with IBM InfoSphere Data Replication CDC," IBM, Mar. 2012, 484 pages, <http://www.redbooks.ibm.com/redbooks/pdfs/sg247941.pdf>.
Ferreira et al., "Self-tunable DBMS Replication with Reinforcement Learning", IFIP International Federation for Information Processing 2020, Published by Springer Nature Switzerland AG 2020, A. Remke and V. Schiavoni (Eds.): DAIS 2020, LNCS 12135, pp. 131-147, 2020, https://doi.org/10.1007/978-3-030-50323-9_9.
Klein et al., "Using Reinforcement Learning to Control Life Support Systems", Abstract, SAE Technical Paper 2004-01-2439, 2004, 2 pages, https://doi.org/10.4271/2004-01-2439.
Mattei, Thomas, "Logical SQL Server data replication 101", SQLShack, May 4, 2018, 10 pages, <https://www.sqlshack.com/logical-replication-101/>.
Mell et al., "The NIST Definition of Cloud Computing," Recommendations of the National Institute of Standards and Technology, U.S. Department of Commerce, Special Publication 800-145, Sep. 2011, 7 pages.
Saleem, "Cost Optimization for Data Placement Strategies in an Analytical Cloud Service," University of Stuttgart, Oct. 17, 2016, 106 pages, <https://elib.uni-stuttgart.de/bitstream/11682/9824/1/main-report.pdf>.
Spielberg et al., "Deep Reinforcement Learning Approaches for Process Control", 2017 6th International Symposium on Advanced Control of Industrial Processes (AdCONIP), May 28-31, 2017, Taipei, Taiwan, 6 pages.
Stolze et al., "Autonomous Data Ingestion Tuning in Data Warehouse Accelerators," Datenbanksysteme für Business, Technologie und Web (BTW 2017), Mar. 2017, 11 pages, <http://btw2017.informatik.uni-stuttgart.de/slidesandpapers/H2-12-48/paper_web.pdf>.
Stolze et al., "Partial Reload of Incrementally Updated Tables in Analytic Database Accelerators," Datenbanksysteme für Business, Technologie und Web (BTW 2019), Mar. 8, 2019, 11 pages, <https://btw.informatik.uni-rostock.de/download/tagungsband/C7-2.pdf>.
Zhang et al., "An End-to-End Automatic Cloud Database Tuning System Using Deep Reinforcement Learning", SIGMOD '19, Jun. 30-Jul. 5, 2019, Amsterdam, Netherlands, pp. 415-432, https://doi.org/10.1145/3299869.3300085.

* cited by examiner

REPLICATING DATA CHANGES USING MULTIPLE STORAGE DEVICES AND TRACKING RECORDS OF PENDING DATA CHANGES STORED ON THE STORAGE DEVICES

BACKGROUND

The present invention relates to the field of database technology, and more specifically, to replicating data changes of a table of a source database system in a table of a target database system.

A replication of data changes done in a table of a source database system in a table of a target database system may be performed to create a backup of the table of the source database. Another application of such a replication of data changes may be to synchronize the table of the target database system with the table of the source database system, for example, where the table of the target database system includes a different ordering scheme than the table of the source database system. Generally, the replication of data changes should be performed as fast as possible to maintain data of the table of the target database system as synchronously as possible to data of the table of the source database system. The data changes may be replicated according to different types of replication strategies. A first type may include individually replicating single rows of the table of the source database system. Another type of replication strategy may include replicating several rows, even the bulk of the rows, of the table of the source database at once.

SUMMARY

Various embodiments provide a method, a computer system, and a computer program product for replicating data changes as described in the independent claims. Advantageous embodiments are described in the dependent claims. Embodiments of the present invention can be freely combined with each other if they are not mutually exclusive.

According to aspects of the present invention, a method is provided for replicating data changes of a table of a source database system in a table of a target database system. The method includes repeatedly generating log files while performing data changes of a table of a source database system, each log file including at least one record of data change of the table of the source database system. The method further includes storing the log files on a first memory device, the first memory device having a first access time. The method further includes archiving a part of the log files being stored on the first memory device on a second memory device, the second memory device having a second access time, where the second access time is higher than the first access time. The method further includes tracking a second number of second pending data changes, the second pending data changes being the data changes of the records of data change of the log files being archived on the second memory device which are not yet replicated in a table of a target database system. The method further includes selecting a type of data replication from a first type of data replication and a second type of data replication based on the second number. The method further includes replicating the data changes of the table of the source database system in the table of the target database system according to the selected type of data replication using the records of data change of the log files.

In some embodiments, the first type of data replication includes loading each of the records of data change individually and replicating a respective data change of a single row of the table of the source database system in the table of the target database system according to the corresponding individually loaded record of data change. In some embodiments, the second type of data replication includes loading information for updating several rows of the table of the target database system together and updating the several rows of the table of the target database system based on the information.

In some embodiments, the method may optionally further include tracking a first number of first pending data changes, the first pending data changes being the data changes of the records of data change of the log files being stored on the first memory device which are not yet replicated in the table of the target database system, where selecting the type of data replication is based on the first number and the second number.

Optionally, in some embodiments, the selecting of the type of data replication may include a weighting of the first number and a weighting of the second number, where the weighting of the first number is based on the first access time and the weighting of the second number is based on the second access time.

In some embodiments, the method may optionally further include selecting the first type of data replication if a ratio between the first number and the second number is greater than or equal to a third threshold; and selecting the second type of data replication if the ratio between the first number and the second number is less than the third threshold. The ratio may be a weighted ratio with the first number being weighted dependent on the first access time and the second number being weighted dependent on the second access time.

In some embodiments, the method may optionally further include calculating a weighted sum of the first number and the second number, where the first number is weighted based on the first access time and the second number is weighted based on the second access time. In such embodiments, the first type of data replication is selected if the weighted sum is less than a fourth threshold and the second type of data replication is selected if the weighted sum is greater than or equal to the fourth threshold.

In some embodiments, the method may optionally further include obtaining respective log numbers, where each respective log number is assigned to a respective one of the log files and each respective log number indicates a total number of records of data change of the table of the source database system having been written until a respective moment a generating of the respective log file is started. In such embodiments, the method may further include tracking the first number and the second number using the respective log numbers assigned to the log files.

Optionally, in some embodiments, the tracking of the first number includes calculating a difference between the respective log number assigned to the log file being stored a shortest time on the first memory device and the respective log number being assigned to the log file being stored a longest time on the first memory device.

Optionally, in some embodiments, the tracking of the first number includes calculating a difference between an actual total number of data changes of the table of the source database system at an actual instant of time and the respective log number assigned to the log file being stored a longest time on the first memory device.

In some embodiments, the method may optionally further include tracking a record number of a last record of data change being read out from the first memory device or the second memory device to be used for a replication of a data change in the table of the target database system according to the last record of data change; and using the record number of the last record of data change for tracking the first number or the second number.

In some embodiments, the method may optionally further include calculating the second number as a difference between the respective log number assigned to the log file being stored a longest time on the first memory device and the record number assigned to the last record of data change, wherein the last record of data change is included in one of the log files being archived on the second memory device.

In some embodiments, the method may optionally further include calculating the first number as a difference between the respective log number assigned to the log file being stored a shortest time on the first memory device and the record number being assigned to the last record of data change, wherein the last record of data change is included in one of the log files being stored on the first memory device.

In some embodiments, the method may optionally further include counting a total number of records of data change of the table of the source database system using a counter. In such embodiments, the method may further include determining whether the counter is in a state that is close to an overflow of the counter. In such embodiments, the method may further include selecting the second type of data replication if the counter is in the state that is close to the overflow of the counter. In such embodiments, the method may further include resetting the counter after replicating the data changes of the table of the source database system in the table of the target database system according to the second type of data replication using the records of data change of the log files. In some embodiments, the second type of data replication may include loading all records of data change being stored on the first memory device and the second memory device together and replicating the data changes of more than one row of the table of the source database system in the table of the target database system according to all the loaded records of data change.

According to another aspect of the present invention, a computer program product is provided comprising a computer-readable storage medium having computer-readable program instructions embodied therewith, the computer-readable program instructions executable by one or more processors to perform the method according to any of the preceding embodiments.

According to another aspect of the present invention, a computer system is provided for replicating data changes of a table of a source database system in a table of a target database system. The computer system may be configured to perform the method according to any of the preceding embodiments.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
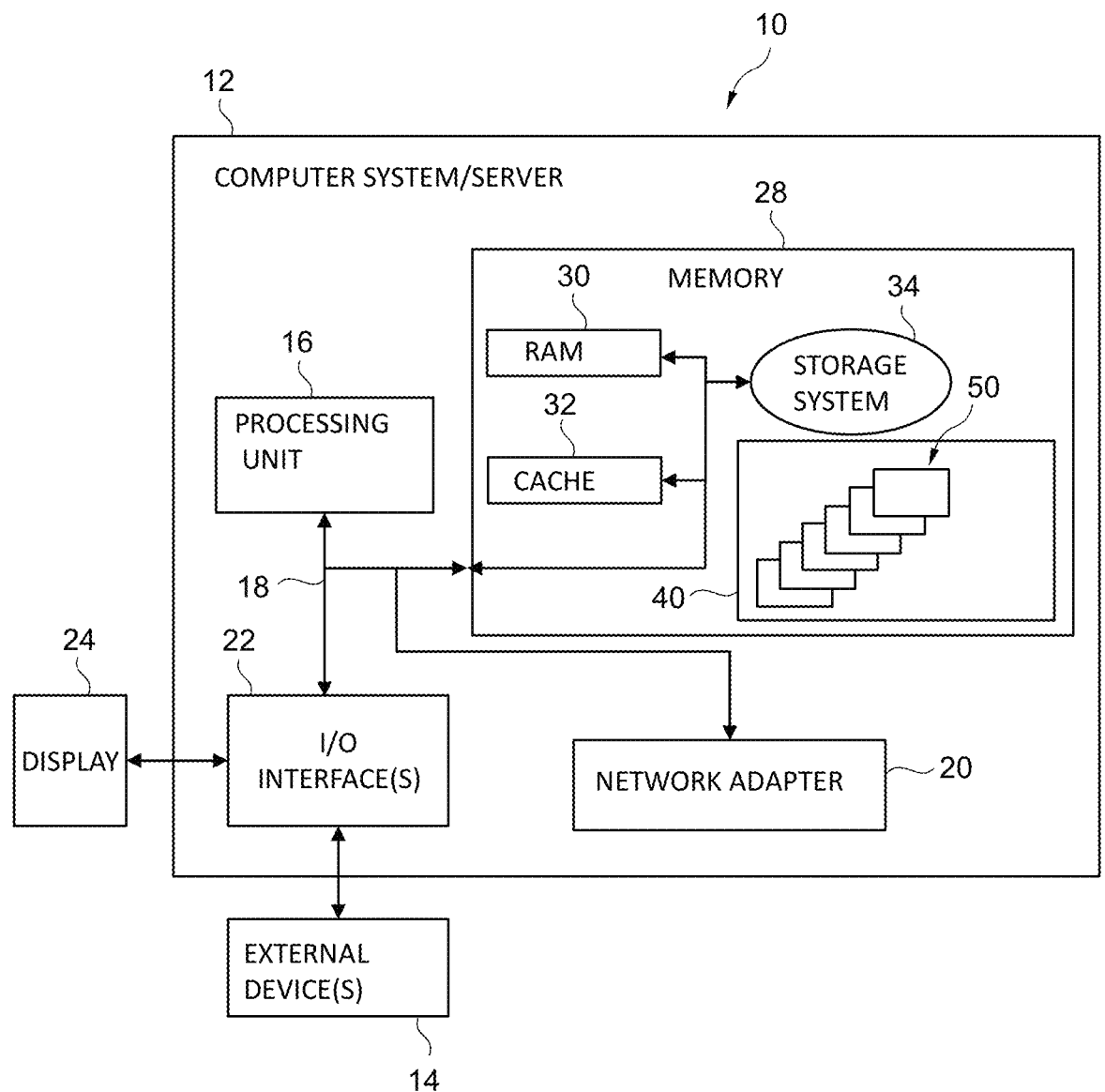
FIG. 1 illustrates a computer system in accordance embodiments of with the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A table of the source database system is referred to as a source table and a table of a target database system is referred to as a target table in the following. The records of each log file generated while performing the data changes of the source table may each comprise all necessary information to replicate a single data change of the source table. A single data change of the source table may comprise a change of a value of a single data field of the source table or a change of values of several data fields of a single row of the source table. The single data field may be specified by a number of a row and a number of a column of the source table. The value of the single data field may be a number and/or a character string. The necessary information to replicate the single data change may include, for example, a new data value of the single data field of the source table after the data change has been performed and the number of the row and the number of the column of the source table specifying the single data field. In a case where the single data change may comprise the change of values of several data fields of a single row of the source table, the necessary information to replicate the single data change may include a respective new data value of each data field being modified when performing the single data change, the number of the row comprising these modified data fields and a respective column indicating each modified data field.

With every new data change of the source table being performed, a new record of data change may be generated comprising the necessary information to replicate that data change in the target table. The new record of data change may be written in an actual log file. The new record may be written in the actual log file at a position following the last written record of data change in the actual log file, the last written record indicating the last performed data change of the source table. Accordingly, an order of data change of the source table may be represented by an order of the records of data change in the log files.

A new log file may be generated if a size of the actual log file reaches a given threshold. As such, the log files may be generated repeatedly. As the source table may be maintained for a long period of time, for example for years or decades, a total number of data changes of the source table may be greater, for example, than one thousand, one million, one billion, or the like. The total number of data changes may be higher than a number of data fields or rows of the source table as the data fields may be changed several times in a lifetime of the source table.

The term "tracking the second number" as used herein refers to any type of determining of the second number, for example counting, calculating, and/or updating a second counter representing the second number. The tracking of the second number may involve updating the second counter whose value may represent the second number. The second counter may be updated if one of the second pending data changes has been recently replicated in the target table. In this case, the second counter may be decreased by one. In addition, the tracking of the second number may involve updating the second counter if a new log file may be stored on the second memory device. In this case, the second counter may be increased by a number of records included in the new log file being stored on the second memory device.

The term "archiving the part of the log files on the second memory device" as used herein refers to storing a part of the log files on a second memory device. The term "archiving" is used to express that a second access time is higher than a first access time. The first and second access time may be defined by a first time and a second time respectively which it takes to perform a write or read command after the first or second memory device have received the write or read command. The second memory device may be a hard disk drive, a tape, or the like. The second memory device may include a moving element for accessing data stored on the second memory device, for example a rotating disk or tape. The second access time may comprise, for example, a time interval used for positioning a read-and-write head of the second memory according to the read command, also known as seek time. The first memory device may be a solid-state-drive (SSD), a flash memory, or the like. The first memory device may not include moving elements for reading out data stored on the first memory device.

Generally, to reach a high performance of replicating the data changes it is advantageous to store all the log files on the first memory device (e.g., lower access time, etc.). However, the first memory device may be more expensive than the second memory device. For that reason, a size of the first memory may be limited and the part of the log files being stored on the first memory device may be archived on the second memory device if an available space on the first memory is close to zero.

As the second access time (e.g., second memory device, etc.) is higher than the first access time, the replicating of the data changes may be slowed down for a longer period of time if the second number of second pending data changes exceeds a certain first level and a frequency of data changes performed in the source table exceeds a certain second level. In such case, performing the first type of data replication (e.g., incremental data replication, etc.) may lead to a deadlock situation where within a given time interval more log files are archived on the second memory device than can be replicated. In such a situation, performing the second type of data replication (e.g., bulk data replication, etc.) may resolve or avoid the deadlock situation. According to aspects of the present invention, by tracking the second number and selecting the type of data replication based, at least in part, on the second number, a deadlock situation or a situation close to a deadlock situation may be detected and prevented. In some embodiments, the tracking of the second number may be performed automatically by checking an actual value of the second number and/or by checking a temporal change of the actual value of the second number.

The first level and the second level may depend on a design of a computer system for performing the replication of the data changes, especially on the second access time. The frequency of data changes performed in the source table may depend on a usage behavior of the source database system.

In some embodiments, the second type of data replication may be selected if the second number is greater than a second threshold. The second threshold may depend on the second access time and/or a bandwidth of replicating the data changes. Such embodiments can provide for a fast way to perform the selection of a type of data replication as only one value needs to be compared. Furthermore, selecting the type of data replication based on only one value may alleviate a need to calibrate a computer system for performing the data replication since only one threshold, here the second threshold, needs to be adapted to the usage of the source database system.

In some embodiments, determining a selection of a type of data replication may include tracking a first number of first pending data changes, the first pending data changes being the data changes of the records of data change of the log files being stored on the first memory device which are not yet replicated in the table of the target database system. Accordingly, in some embodiments, the selecting may be dependent on the first number and the second number. As such, the first pending data changes may also be taken into account and a deadlock situation may be anticipated more accurately.

The term "tracking the first number" as used herein refers to any type of determining of the first number, for example counting, calculating, or updating a first counter representing the first number. The tracking of the first number may involve updating the first counter whose value may represent the first number. The first counter may be updated if one of the first pending data changes has been recently replicated in the target table. In this case, the first counter may be decreased by one. In addition, the tracking of the first number may involve updating the first counter if a new log file is stored on the first memory device. In this case, the first counter may be increased by a number of records included in the new log file.

In some embodiments, loading the information for updating the several rows of the table of the target database system may include loading several ones of the records of data change together. In some embodiments, updating the several rows of the table of the target database system may include replicating data changes of several rows of the table of the source database system in the table of the target database system according to the loaded records of data change. Each of the several rows of the table of the source database system may correspond to one of the several rows of the table of the target database system. The several ones of the records of data change may be loaded from the first memory device or the second memory device. By loading the several ones of the records of data change together, the data replication may be accelerated. Thus, a deadlock situation may be prevented.

In some embodiments, loading the information for updating the several rows of the table of the target database system may include loading data values of the several rows of the table of the source database system, which may also be referred to herein as a second case of the second type of data replication. Accordingly, in some embodiments, the records of data change may not be needed for performing the second type of data replication. The several rows of the target table and the several rows of the source table may be a partition of the target table and the source table respectively. As an example, the several rows of the target table and the source table may constitute the whole target table and the whole source table respectively. The data values of the several rows of the source table may each provide an actual data value of a single data field of the several rows of the source table. Once, the data values of the several rows of the source table are loaded, these values may be copied to corresponding data fields of the target table for updating the target table. The data values may be loaded directly from the source database system. By loading the data values of the several rows of the source table, a replication of several data changes of one of the single data fields of the source table may be skipped to update the corresponding data field in the target table. As such, the data replication may be accelerated and a deadlock situation may be prevented.

In some embodiments, the selection of the type of data replication may include comparing first computational costs needed for performing all pending data changes, for example, the first and the second pending data changes, using the first type of data replication with second computational costs needed for performing the updating of all rows of the target table according to the second case of the second type of data replication. If the first computational costs are greater than the second computational costs, the second type of data replication may be selected, otherwise the first type of data replication may be selected.

In some embodiments, determining a selection of a type of data replication may include selecting the second type of data replication if the first number is greater than a first threshold and the second number is greater than a second threshold. Such embodiments can present a simple implementation to take into account the first and the second pending data changes. If the first number is greater than the first threshold and the second number is greater than the second threshold, it can be assumed that a deadlock situation may be reached soon. Similar to the second threshold, the first threshold may be adapted to the usage of the source database system and an achievable bandwidth of replicating the data changes.

In some embodiments, the selection of a type of data replication may include a weighting of the first number and the second number. As an example, the weighting of the first number may be dependent on the first access time and the weighting of the second number may be dependent on the second access time. By performing the weighting of the first number and the second number with respect to the respective access times, the difference between the first and the second access time may be taken into account. This may alleviate a need to adapt a method of replicating the data changes to a design of a computer system. For example, the higher the second access time, the more the second number may be weighted dependent on the second access time to produce a key figure based on which the selection of a type of data replication may be performed. The weighting may be used to determine the first computational costs mentioned above.

In some embodiments, the selection of a type of data replication may include selecting the first type of data replication if a ratio between the first number and the second number is greater than or equal to a third threshold. Accordingly, in some embodiments, the selection may include selecting the second type of data replication if the ratio between the first number and the second number is less than the third threshold. The ratio may be in the form of a quotient with the first number being the numerator of the quotient and the second number being the divisor of the quotient. The third threshold may be adapted to a further ratio between the first access time and the second access time. By comparing the ratio between the first number and the second number with the third threshold, the difference between the first and the second access time may be taken into account in a simple manner. The ratio may be used as a key figure, for example as a single key figure, based on which the selection of the type of data replication may be performed. The computer system may be adapted to the usage of the source database system by tuning the third threshold.

In some embodiments, the ratio may be a weighted ratio that includes the first number being weighted dependent on the first access time and the second number being weighted dependent on the second access time. The ratio being the weighted ratio may serve more precisely as a key figure based on which the selection of the type of data replication may be performed, as it may take into account the first access time and the second access time.

In some embodiments, the selection of the type of data replication may include calculating a weighted sum of the first number and the second number, the first number being weighted based on of the first access time and the second number being weighted based on of the second access time. Accordingly, in some embodiments, the selection may include selecting the first type of data replication if the weighted sum is less than a fourth threshold and selecting the second type of data replication if the weighted sum is greater than or equal to the fourth threshold. The weighted sum may represent an amount of a total access time for accessing all the records of the first memory device and the second memory device to perform all the first and second pending data changes. For that reason, the weighted sum may serve well as a key figure for estimating whether or not a deadlock situation may occur soon. Therefore, the weighted sum may serve well as a key figure based on which the selection of the type of data replication may be performed. The weighted sum may be used to determine the first computational costs mentioned above.

In some embodiments, the second type of data replication may include loading information for updating all rows of the table of the target database system together and updating all the rows of the table of the target database system based on the information for updating all rows of the target table. The information for updating all the rows of the target table may be in the form of all the records of the first and second pending data changes in a first case, or in the form of all the data values of the source table in a second case. Hence, in the first case, the updating of all the rows of the target table may include performing a replication of all the data changes according to the first and second pending data changes. In the second case, the updating of all the rows of the target table may include setting each data value of the target table equal to a corresponding one of the data values of the source table.

In some embodiments, after all the rows have been updated, all the log files may be deleted from the first and the second memory device. It may be assumed, for example, that after such a kind of clean-up of the first and second memory device it may take some time until further records of data change being stored on the first memory device may be archived on the second memory device. As such, some embodiments may provide for shifting the computer system from a state in which the records of data change are continuously loaded from the second memory device to perform the replicating of the data changes, to a state in which the records of data change are continuously loaded from the first memory device to perform the replicating. As a result, performance of the replication may be improved.

In some embodiments, the selection of the type of data replications may include using respective log numbers. For example, each respective log number may be assigned to a respective one of the log files. The respective log number may indicate a total number of records of data change of the table of the source database system having been written at a respective moment that a generating of the respective log file is started. In some embodiments, the log numbers assigned to the log files may be used when performing the tracking of the first number and the second number. This may reduce the computational cost for determining the first and/or the second number. For example, it may not be necessary to read all records of the log files being stored on the second memory device to count these records. The same can hold for determining the second number.

In some embodiments, the log files each include the respective log number assigned to them. For example, the log number assigned to each respective log file may be embedded in that respective log file. This can provide the advantage that the log numbers and their assignment to the respective log files does not need to be stored on a further memory device apart from the first and the second memory device.

In some embodiments, the tracking of the first number may comprise calculating a difference between the log number assigned to the log file being stored the shortest time on the first memory device and the log number assigned to the log file being stored the longest time on the first memory device. The first number may be set to that difference between the log numbers. This calculation may provide for a simple and fast manner to determine the first number, in some embodiments. The log file being stored the longest time on the first memory device may also be referred to herein as the oldest log file. The log file being stored the shortest time on the first memory device may also be referred to herein as the youngest log file.

In some embodiments, the tracking of the first number may include calculating a difference between an actual total number of data changes of the table of the source database system at an actual instant of time and the log number being assigned to the log file being stored the longest time on the first memory device. The actual total number of data changes may be retrieved from the source database. The source database system may include a record counter for counting the actual total number of data changes. Using the actual total number of data changes instead of the log number of the youngest log file can allow for a more precise determination of the first number. Generally, it is possible that a last record being generated by means of the source database system (e.g., referred to herein as a last generated record) may be directly written in the youngest log file.

In some embodiments, the selection of a type of data replication may include tracking a record number of the last record of data change being read out from the first memory device or the second memory device and used for a replication of a data change in the table of the target database system according to the last record of data change (e.g., also referred to as last processed record or last record of data change). In some embodiments, the selection of the type of data replication may include using the record number of the last record of data change for tracking the first number or the second number. The record number of the last processed record may represent a total number of records of data change of the table of the source database system being written at a moment the last processed record is written, including the last processed record. Each record of data change may include a record number being equal to a total number of records of data change of the table of the source database system being written at a moment that record is written, including that record. Tracking the record number of the last processed record may facilitate tracking the first number and/or second number. For example, the above mentioned first counter and second counter may not be needed and updated in such case. The tracking of the record number of the last processed record may comprise reading the record number of the lastly processed record.

In some embodiments, the selection of a type of data replication may include calculating the second number as a difference between the log number being assigned to the log file being stored the longest time on the first memory device and the record number being assigned to the last record of data change. In some embodiments, the last record of data change may be included or provided by one of the log files being archived on the second memory device. Such embodiments may provide a simple manner of determining the second number without using the first counter or the second counter, instead just using the record number of the last processed record and the log number assigned to the oldest log file.

In some embodiments, the selection of the type of data replication may include calculating the first number as a difference between the log number assigned to the log file being stored the shortest time on the first memory device and the record number being assigned to the last record of data change. In some embodiments, the last record of data change may be included in or provided by one of the log files being stored on the first memory device. Such embodiments may provide a simple way of determining the first number without using the first counter or the second counter, instead just using the record number of the last processed record and the log number assigned to the youngest log file.

In some embodiments, the selection of the type of data replication may include restoring the log files. The restoring may include storing the log files being archived on the second memory device on the first memory device. The restored log files may be read and processed from the first memory device instead of from the second memory device to perform the replication of the data changes. Thus, the replication of the data changes may be accelerated. The restoring may be performed based on an estimate of computational costs of the restoring of the log files.

In some embodiments, the selection of the type of data replication may include performing the restoration of the log files based on respective sizes of the records of data change of the log files being archived on the second memory device. An estimation of the computational costs of the restoring of the log files may be performed based on the respective sizes of the records of data change of the log files being archived on the second memory device. As such, a decision whether restoring of the log files should be performed may be made based on more detailed information with respect to the computational costs of the restoring of the log files.

In some embodiments, the selection of the type of data replications may include using a counter for counting the total number of records of data change of the table of the source database system. The counter may be the above-mentioned record counter. In some embodiments, the selection may include a determination whether the counter is in a state that is close to an overflow of the counter. In some embodiments, a selection of the second type of data replication may be made if the counter is in the state that is close to the overflow of the counter. The counter can be reset after replicating the data changes of the table of the source database system in the table of the target database system according to the second type of data replication using the records of data change of the log files. In some cases, determining when the counter may be in a state that is close to an overflow of the counter may allow for preventing the overflow of the counter.

In some embodiments, the second type of data replication may include loading all records of data change being stored on the first memory device and the second memory device together and replicating the data changes of more than one row of the table of the source database system in the table of the target database system according to all the loaded records of data change. Loading all records of data change being stored on the first memory device and the second memory device together may prevent having to perform a recalculation of the log numbers of the log files being stored on the first memory device and the second memory device. After loading all records of data change being stored on the first memory device and the second memory device, these records may be deleted from the first memory device and the second memory device.

Embodiments of the present invention may be implemented using a computing device that may also be referred to as a computer system, a client, a server, and/or the like. Referring now to FIG. 1, a schematic of an example of a computer system 10 is shown. The computer system 10 provides only one example of a suitable computer system and is not intended to suggest any limitation as to the scope of use and/or functionality of embodiments of the invention described herein. Regardless, computer system 10 is capable of implementing and/or performing any of the functionality set forth herein.

The computer system 10 may include a first computer system/server 12, which may be operational with numerous other general-purpose or special-purpose computing system environments and/or configurations. Examples of well-known computing systems, environments, and/or configurations that may be suitable for use with first computer system/server 12 include, but are not limited to, a first memory 411 of the computer system 10 (e.g., shown in FIG. 4), personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, distributed computing environments that include any of the above systems or devices, and the like.

The first computer system/server 12 may be described in the general context of computer system executable instructions, such as program modules, being executed by a computer system. Generally, program modules may include routines, programs, objects, components, logic, data structures, and/or the like that perform particular tasks or implement particular abstract data types. As an example, the first computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, the first computer system/server 12 in computer system 10 is shown in the form of a general-purpose computing device. The components of the first computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The first computer system/server 12 typically includes a variety of computer system readable media. Such media may be any available media that is accessible by the first computer system/server 12, and it includes both volatile and non-volatile media, removable and non-removable media.

System memory 28 can include computer system readable media in the form of volatile memory, such as random access memory (RAM) 30 and/or cache memory 32. The first computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 50, may be stored in memory 28 by way of example, and not limitation, as well as an operating system, one or more application programs, other program modules, and program data. Each of the operating system, one or more application programs, other program modules, and program data, or some combination thereof, may include an implementation of a networking environment. Program modules 50 generally may be configured to carry out the functions and/or methodologies of embodiments of the invention as described herein.

The term "program" or "program module" as used herein refers to a set of instructions which may contain commands to provoke actions performed by the processor 16 when the processor 16 may read the commands. The set of instructions may be in the form of a computer-readable program, routine, subroutine, or part of a library, which may be executed by the processor 16 and/or may be called by a further program being executed by the processor 16. Preferably the program modules 50 may be executable programs which are compiled according to a type of hardware platform of the first computer system/server 12.

The first computer system/server 12 may also communicate with one or more external devices 14 such as a keyboard, a pointing device, a display 24, etc.; one or more devices that enable a user to interact with the first computer system/server 12; and/or any devices (e.g., network card, modem, etc.) that enable the first computer system/server 12 to communicate with one or more other computing devices. Such communication can occur via Input/Output (I/O) interfaces 22. Additionally, the first computer system/server 12 may communicate with one or more networks such as a local area network (LAN), a general wide area network (WAN), and/or a public network (e.g., the Internet) via network adapter 20. As depicted, network adapter 20 may communicate with the other components of the first computer system/server 12 via bus 18. It should be understood that although not shown, other hardware and/or software components could be used in conjunction with the first computer system/server 12. Examples, include, but are not limited to: microcode, device drivers, redundant processing units, external disk drive arrays, RAID systems, tape drives, and data archival storage systems, etc.

Figure 4:
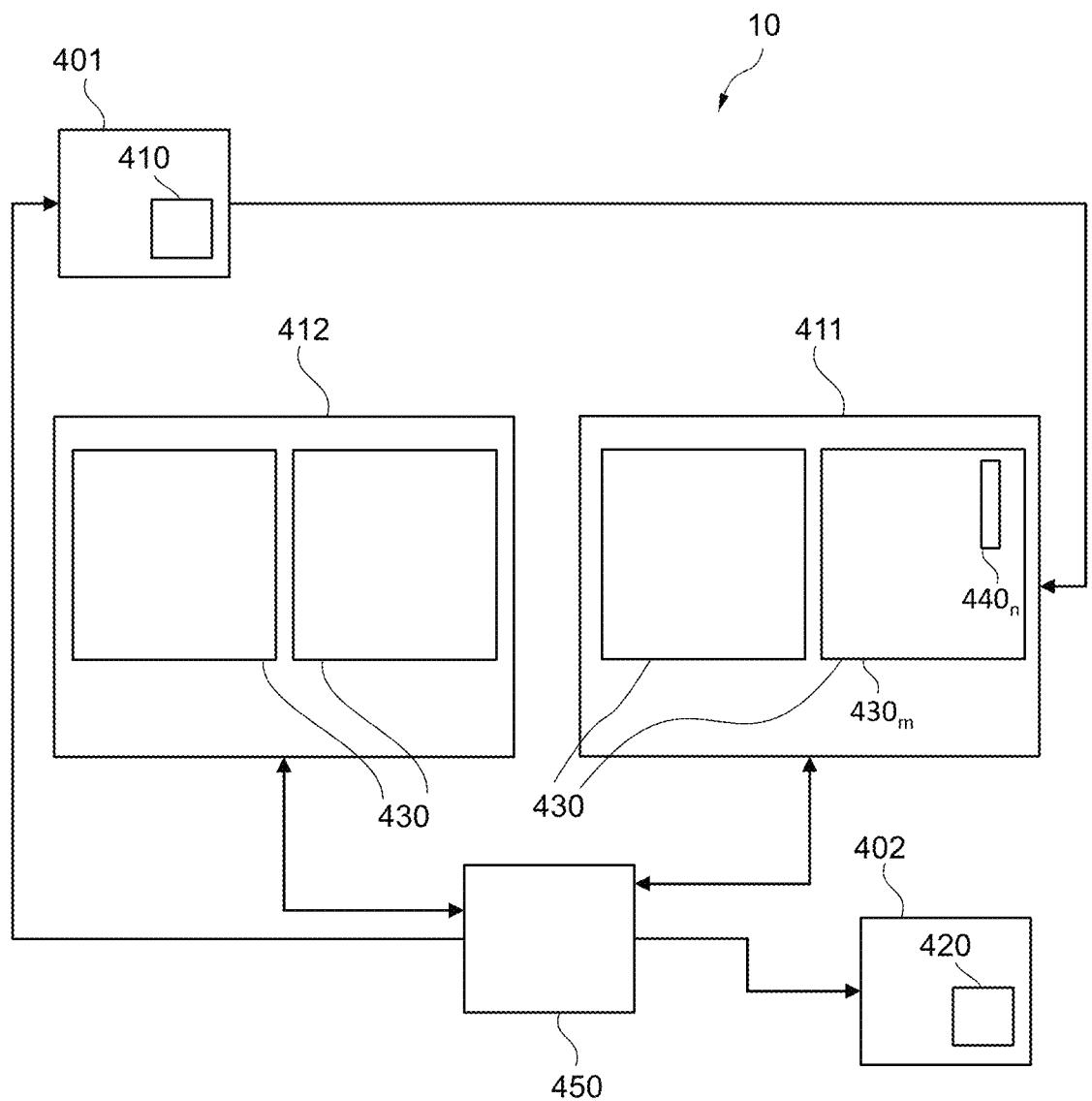
FIG. 4 depicts a source database system, a target database system, a first memory device, and a second memory device for performing a data replication of the source database system in the target database system in accordance with embodiments of the present invention.
Figure 5:
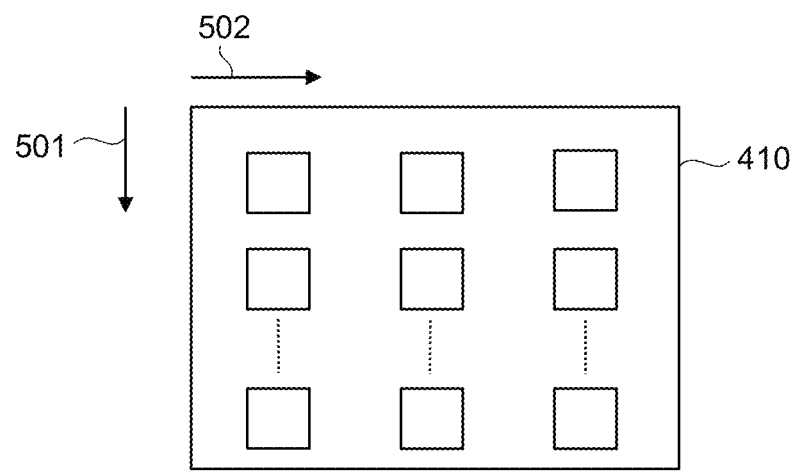
FIG. 5 depicts a table of a source database system in accordance with embodiments of the present invention.

As an example, the first computer system/server 12 may be designed in the form of a source database system, such as source database system 401 shown in FIG. 4. The source database system 401 may comprise a source table 410, as shown in FIGS. 4 and 5. The source table 410 may comprise data fields, for example, shown as boxes in FIG. 5. The data fields may each include an entry, for example a number and/or character string. Each data field of the source table 410 may be assigned a specific row number of the source table 410 and a specific column number of the source table 410. The specific row number of the source table 410 may increase in the direction of the first arrow 501 shown in FIG. 5. The specific column number of the source table 410 may increase in the direction of the second arrow 502 shown in FIG. 5. The row number and the column number of each data field may be used to perform a data change of the respective data field. In addition, a selected row number of the source table 410 and several different selected column numbers of the source table 410 may be used to perform several data changes of different data fields of a single row specified by the selected row number. As an example, the source table 410 may be stored in the storage system 34 of the first computer system/server 12.

Figure 2:
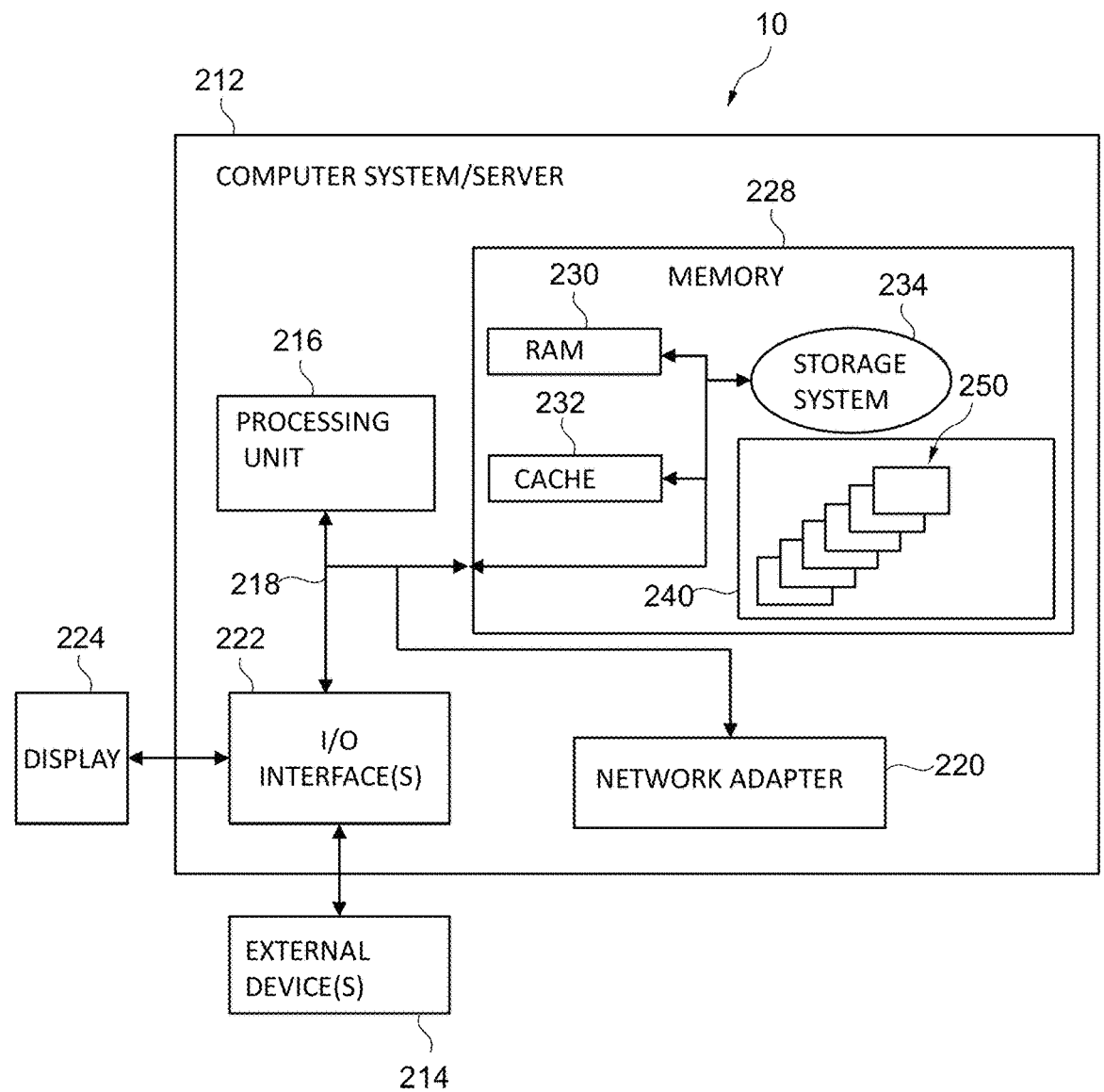
FIG. 2 illustrates a second computer system/server of the computer system shown in FIG. 1 in accordance with embodiments of the present invention.

The computer system 10 may include a second computer system/server, for example, computer system/server 212 as shown in FIG. 2, which may be operational with numerous other general-purpose or special-purpose computing system environments and/or configurations. Examples of well-known computing systems, environments, and/or configurations that may be suitable for use with second computer system/server 212 include, but are not limited to, the first memory 411, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, distributed computing environments that include any of the above systems or devices, and/or the like.

The second computer system/server 212 may be described in the general context of computer system executable instructions, such as program modules, being executed by a computer system. Generally, program modules may include routines, programs, objects, components, logic, data structures, and on the like that perform particular tasks or implement particular abstract data types. The second computer system/server 212 may be practiced in distributed computing environments where tasks are performed by remote processing devices that are linked through a communications network. In a distributed computing environment, program modules may be located in both local and remote computer system storage media including memory storage devices.

As shown in FIG. 2, the second computer system/server 212 in computer system 10 is shown in the form of a general-purpose computing device. The components of the second computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The second computer system/server 212 typically includes a variety of computer system readable media. Such media may be any available media that is accessible by the second computer system/server 212, and it includes both volatile and non-volatile media, removable and non-removable media.

System memory 228 can include computer system readable media in the form of volatile memory, such as random access memory (RAM) 230 and/or cache memory 232. The second computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 250, may be stored in memory 228 by way of example, and not limitation, as well as an operating system, one or more application programs, other program modules, and program data. Each of the operating system, one or more application programs, other program modules, program data, or some combination thereof, may include an implementation of a networking environment. Program modules 250 generally may be configured to carry out the functions and/or methodologies of embodiments of the invention as described herein.

The term "program" or "program module" as used herein refers to a set of instructions which may contain commands to provoke actions performed by the processor 216 when the processor 216 may read the commands. The set of instructions may be in the form of a computer-readable program, routine, subroutine or part of a library, which may be executed by the processor 216 and/or may be called by a further program being executed by the processor 216. Preferably the program modules 250 may be executable programs which are compiled according to a type of hardware platform of the second computer system/server 212.

The second computer system/server 212 may also communicate with one or more external devices 214 such as a keyboard, a pointing device, a display 224, etc.; one or more devices that enable a user to interact with the second computer system/server 212; and/or any devices (e.g., network card, modem, etc.) that enable the second computer system/server 212 to communicate with one or more other computing devices. Such communication can occur via Input/Output (I/O) interfaces 222. Additionally, the second computer system/server 212 may communicate with one or more networks such as a local area network (LAN), a general wide area network (WAN), and/or a public network (e.g., the Internet) via network adapter 220. As depicted, network adapter 220 may communicate with the other components of the second computer system/server 212 via bus 218. It should be understood that although not shown, other hardware and/or software components could be used in conjunction with the second computer system/server 212. Examples, include, but are not limited to: microcode, device drivers, redundant processing units, external disk drive arrays, RAID systems, tape drives, and data archival storage systems, etc.

Figure 6:
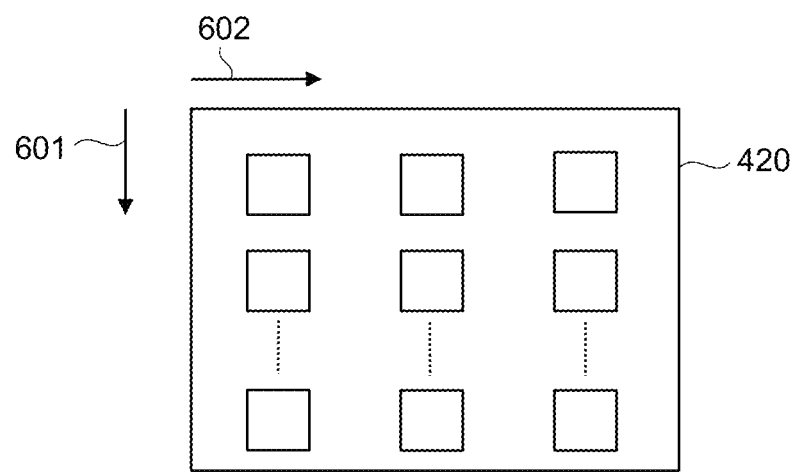
FIG. 6 depicts a table of a target database system in accordance with embodiments of the present invention.

As an example, the second computer system/server 212 may be designed in the form of a target database system, such as target database system 402 shown in FIG. 4. The target database system 402 may comprise a target table 420 as shown in FIGS. 4 and 6. The target table 420 may comprise data fields. The data fields of the target table 420 may each include an entry, for example a number and/or character string. Each data field of the target table 420 may be assigned a specific row number of the target table 420 and a specific column number of the target table 420. The specific row number of the target table 420 may increase in the direction of the first arrow 601 as shown in FIG. 6. The specific column number of the target table 420 may increase in the direction of the second arrow 602 as in FIG. 6. The row number and the column number of each data field may be used to perform a data change of the respective data field. In addition, a selected row number of the target table 420 and several different selected column numbers of the target table 420 may be used to perform several data changes of different data fields of a single row specified by the selected row number. As an example, the target table 420 may be stored in the storage system 234 of the second computer system/server 212.

In some embodiments, a computer system, such as the computer system 10 shown in FIG. 1 and/or FIG. 2, may be used for performing operations disclosed herein such as at least a first, second, third, fourth, fifth, sixth, seventh, and eighth operation.

In some embodiments, the computer system 10 may be configured for replicating data changes of a source table 410 in a target table 420.

Figure 7:
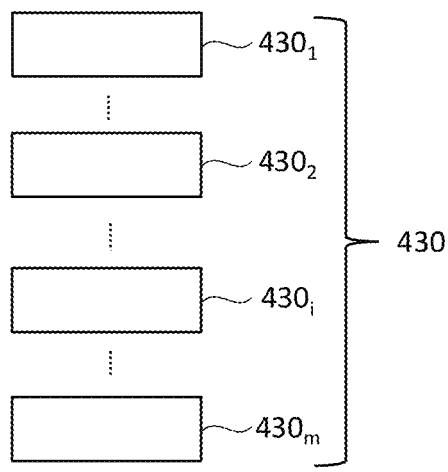
FIG. 7 depicts log files being generated while performing data changes of a table of a source database system in accordance with embodiments of the present invention.

In some embodiments, a first operation may include repeatedly generating log files while performing the data changes of the source table 410. As an example, a set of generated log files 430 is shown in FIG. 7. The processor 16 may perform each data change of the source table 410 by initiating a writing on the storage system 34 on which the source table 410 may be stored. Each log file $430_i$ may comprise at least one record of data change of the source table 410. The first operation may be performed by means of the source database system 401, for example by means of the processor 16.

In some embodiments, the processor 16 may execute a new data change of the source table 410 and may generate a new record of data change $440_n$ comprising the necessary information, such as described above, to replicate the new data change of the source table 410 in the target table 420. Thus, with every new data change, a new record of data change $440_n$ may be generated. Additionally, log files may be generated repeatedly while performing the data changes. In some embodiments, the processor 16 may also execute further data changes of further source tables not shown in the figures. Furthermore, the processor 16 may generate further records of data change comprising the necessary information to replicate the further data changes of the further source tables. The further records may be written in further log files not shown in the figures and/or in the log files 430. Thus, in some embodiments, the log files 430 may include one or more of the further records of data change not shown in the figures. In some embodiments, one or more of the further log files may be stored in between the log files 430.

Figure 8:
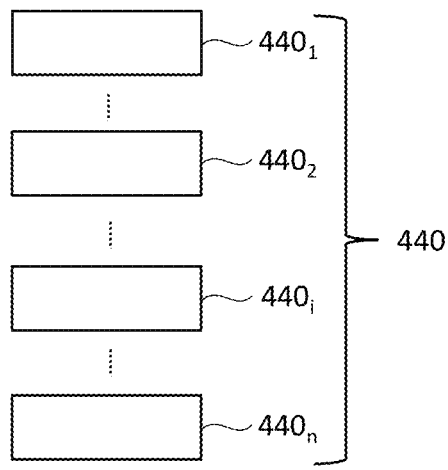
FIG. 8 depicts record of data changes being generated while performing data changes of a table of a source database system in accordance with embodiments of the present invention.

In some embodiments, the new record $440_n$ may be generated by writing the necessary information to replicate the new data change in an actual log file $430_m$. For each further new data change, a further new record of data change may be generated in the same way as the new record $440_n$. As such, for several further new data changes, several further new records of data change may be generated. FIG. 8 shows a set of generated records of data change 440, the source database system 401 may have generated. Each record of data change $440_i$ may include the necessary information, such as described above, to replicate a data change of the source table 410 corresponding to the respective record of data change $440_i$. For example, the source database system 401 may have generated a first record of data change $440_1$, after that a second record of data change $440_2$, and so forth. The last record generated may be the new record $440_n$.

In some embodiments, a second operation may include storing the log files 430 on the first memory device 411. In some embodiments, the storing of the log files 430 may be performed by a further processor 450, for example. The source database 401 may be connected to the first memory device 411 and/or the further processor 450 via the (110) interfaces 22 or via the network adapter 20. The first memory device 411 may include or provide a first access time. As an example, a first access time may be in a range of 35 to 100 microseconds. FIG. 4 shows an example where each of the log files $430_i$, including the actual log file $430_m$, may be generated directly on the first memory device 411. In some embodiments, this may be performed by sending write commands from the source database system 401 to the further processor 450 of the computer system 10, for example.

In some embodiments, however, the log files $430_i$ may be written internally in the source database system 401 and may be sent from the source database system 401 to the first memory device 411. Writing the new record $440_n$ directly on the first memory device 411 without storing it inside the source database system 401 may provide an advantage that the target database system 402 may be able to read the new record $440_n$ as soon as possible. The log files $430_i$ may be stored on the first memory device 411 after and/or during the writing of the log files $430_i$. In some cases, if a size of the actual log file $430_m$ exceeds a given log file size threshold, the further processor 450 may lock the actual log file $430_m$ and generate a new actual log file (not shown in FIG. 4). If the actual log file $430_m$ is locked, the processor 16 may no longer be able to write one of the further new record of data change in the actual log file $430_m$. Instead, the processor 16 may write one of the further new record in a new actual log file.

In some embodiments, a third operation may include archiving a part of the log files 430 being stored on the first memory device 411 on a second memory device 412. The second memory device 412 may include or provide a second access time. The second access time may be higher than the first access time, for example, the second access time may be about 100 to 200 times higher than the first access time. In some embodiments, the further processor 450 may perform the third operation. The further processor 450 may load the part of the log files from the first memory device 411 and archive it on the second memory device 412. In addition, the further processor 450 may delete the archived part of the log files 430 on the first memory device 411. As such, space on the first memory device 411 may be created to allow for writing the further new records in the actual log file $430_m$ and/or to generate a new actual log file.

In some embodiments, the further processor 450, the first memory device 411, and the second memory device 412 may be considered as a replication engine.

Figure 9:
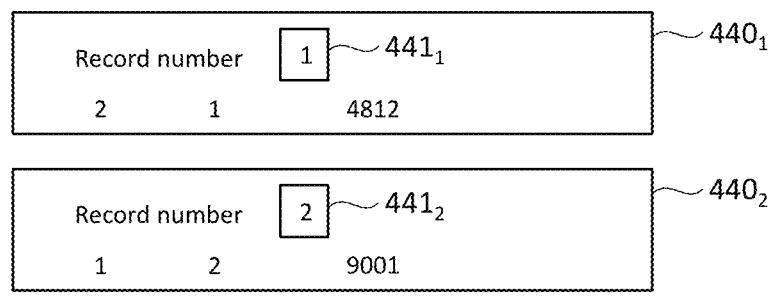
FIG. 9 depicts a first record of data changes and a second record of data changes in accordance with embodiments of the present invention.

In some embodiments, in a fourth operation, the computer system 10 may provide for performance of a first type of data replication, for example, by executing the fourth operation via the processor 216, the first type of data replication may be performed. The first type of data replication may include repeatedly loading each one of the records of data change $440_i$ individually and replicating a respective data change of a single row of the source table 410 in the target table 420 according to the corresponding individually loaded record of data change $440_i$ (e.g., incremental replication, etc.). For example, the first record of data change $440_1$, shown in FIG. 9, may include a first value of the row number, in this example "2", and a first value of the column number, in this example "1", of the source table 410 of a modified data field specified by these values and a new value of this data field, in this example "4812". The second record of data change $440_2$ may include a second value of the row number, in this example "1", and a second value of the column number, in this example "2", of the source table 410 of a modified data field being specified by these values and a new value of this data field, in this example "9001".

Each record $440_i$ may include a record number field $441_i$ containing a record number of the respective record $440_i$ which may indicate a total number of records of data change of the source table 410 being written at a respective moment of a generating of the respective record $440_i$.

According to the first type of data replication, the target database system 402 may load the first record $440_1$ from the first memory device 411 or the second memory device 412 and replicate the data change of the second row of the source table 410 in the target table 420 according to the first record $440_1$. As an example, the processor 216 may provide for setting the value of the data field of the target table 420 specified by the row number "2" and column number "1" equal to 4812. Furthermore, according to the first type of data replication, after having performed a replication of data change in the target table 420 according to the first record $440_1$, the target database system 402 may load the second record $440_2$ from the first memory device 411 or the second memory device 412 and replicate the data change of the first row of the source table 410 in the target table 420 according to the second record $440_2$. For example, the processor 216 may provide for setting the value of the data field of the target table 420 specified by the row number "1" and column number "2" equal to 9001. Thus, in some embodiments, the further processor 450 may access the first memory device 411 or the second memory device 412 each time one of the first record $440_1$ and the second record $440_2$ is loaded from the first memory device 411 or the second memory device 412. For example, in this case, for loading the first record $440_1$ and the second record $440_2$, the first memory device 411 or the second memory device 412 may be accessed twice or the first memory device 411 and the second memory device 412 may each be accessed once.

In some embodiments, in a fifth operation, the computer system 10 may provide for performing a second type of data replication, for example, by executing the fifth operation via the processor 216, the second type of data replication may be performed. The second type of data replication may include loading information for updating several rows of the target table 420 together (e.g., bulk replication, etc.). In some embodiments, this information may be presented by several ones of the records of data change $440_i$, for example, two of the records $440_i$, one hundred of the records $440_i$, all of the records 440 and the like. As such, the several ones of the records of data change $440_i$ may be loaded together from the first memory device 411 or the second memory device 412. Furthermore, data changes of more than one row of the source table 410 may be replicated in the target table 420 according to the loaded records of data change $440_i$. As an example, the processor 216 may load the first record $440_1$ and the second record $440_2$ together from the first memory device 411 or the second memory device 412 and perform a first data change in the target table 420 according to the first record $440_1$ and perform a second data change in the target table 420 according to the second record $440_2$. Loading the several records together may involve accessing the first memory device 411 or the second memory device 412 only once and reading the several records consecutively starting from a reading position which may be realized by a single access of the first memory device 411 or the second memory device 412.

In some embodiments, for the second type of data replication, the information for updating several rows of the target table 420 may be in the form of data values of the source table 410, for example, a partition of data values in the source table 410 or all data values in the source table. As an example, a partition of the data values of the source table 410 maybe representative of a certain month in a case where the source table 410 is ordered with respect to dates. The data values may be loaded directly from the source database system 401, for example from the storage system 34 or the like. The data values of the source table 410 may be loaded together, for example by means of the further processor 450 or the like, from the source database system 401 to the target database system 402 in the form of a matrix, which may have multiple dimensions. In some embodiments, the records of data change 440 may not be used in the second type of data replication.

Figure 10:
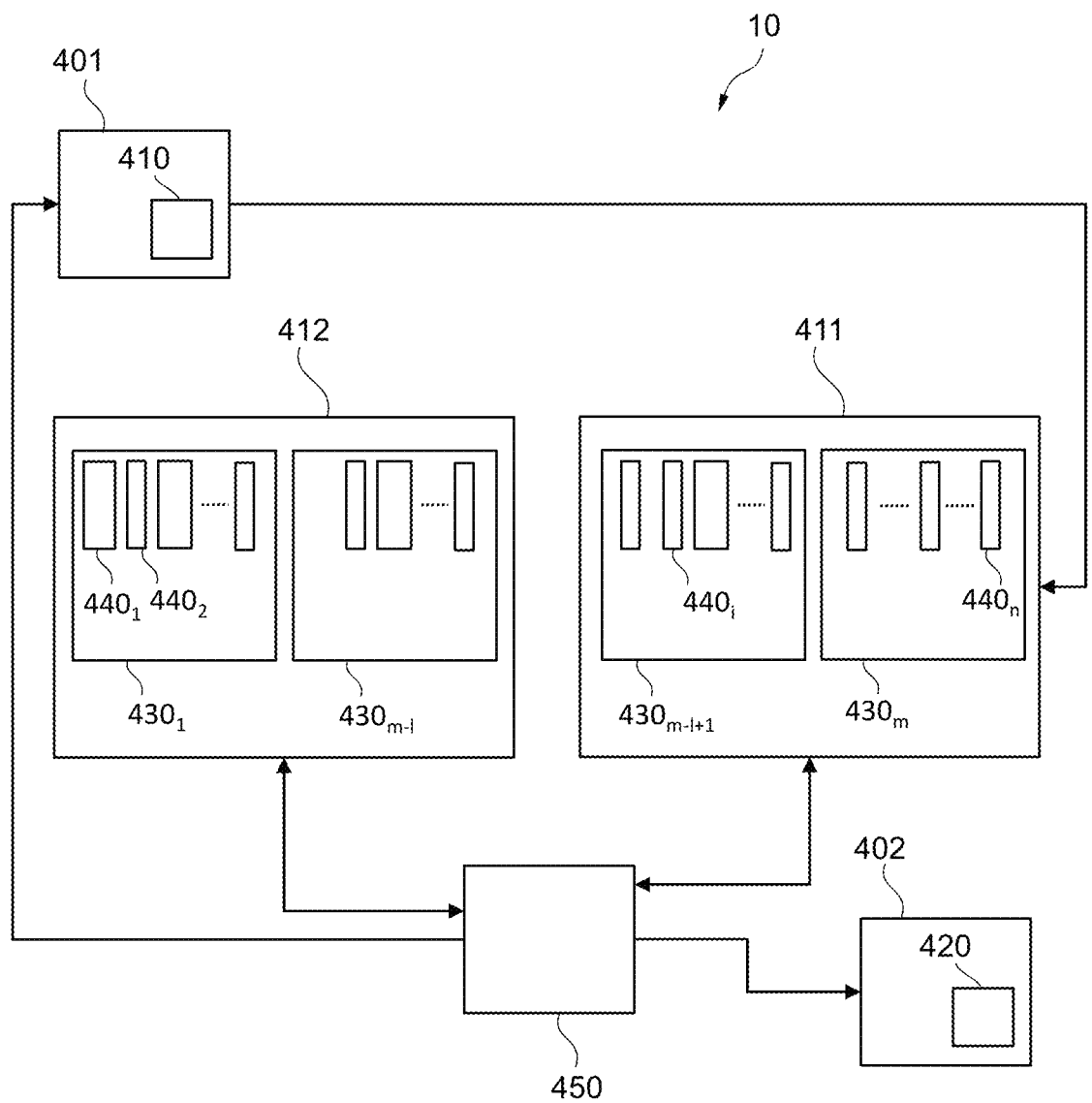
FIG. 10 depicts the source database system, the target database system, the first memory device, and the second memory device as shown in FIG. 4, the first and second memory device storing the log files as shown in FIG. 7 in accordance with embodiments of the present invention.

FIG. 10 illustrates an example embodiment where the first record 440₁ and the second record 440₂ are stored on the second memory device 412. A total number of the log files 430 being stored on the first memory device 411 and the second memory device 412 may be equal to m. A number of the log files 430 being stored on the first memory device 411 may be equal to 1.

The m-th log file 430$_m$ of the log files 430 may be the youngest log file of the first memory device 411 and the (m–l+1)-th log file 430$_{m-l+1}$ of the log files 430 may be the oldest log file of the first memory device 411. A number of log files 430 being stored on the second memory device 412 may be equal to m–l. The (m–l)-th log file 430$_{m-l}$ of the log files 430 may be the youngest log file of the second memory device 412. A first log file 430₁ may be the oldest log file of the second memory device 412. The records of the log files 430 are shown as boxes in FIG. 10.

In some embodiments, a sixth operation may include tracking a second number of second pending data changes. The sixth operation may be performed by means of the further processor 450 or the like. The second pending data changes may be the data changes of the records of data change 440$_i$ of the log files 430 archived on the second memory device 412 which are not yet replicated in the target table 420, which may be referred to as second pending records. The tracking of the second number may be performed by calculating the number of second pending records. In some embodiments, a record number of the last record of data change being read out from the first memory device 411 or the second memory device 412 and used for a replication of a data change in the target table 420 (e.g., referred to as last record of data change) may be tracked. For example, if the last record of data change is the second record 440₂, the record number of the last record of data change may be equal to "2". The record number of the last record of data change may be tracked by reading a value of a second record number field 441₂ of the second record 440₂. In some embodiments, the second number may be calculated by subtracting the record number of the last record of data change from a record number of the youngest record of the youngest log file 430$_{m-1}$ of the second memory device 412. In some embodiments, the second number may be determined by counting the records being stored on the log files of the second memory device 412 from the last record of data change.

In some embodiments, a seventh operation may include selecting a type of data replication from the first type of data replication and the second type of data replication based on the second number. For example, if the second number is greater than the second threshold, the second type of data replication may be selected, for example by means of the processor 216 or the like. Otherwise, the first type of data replication may be selected (e.g., the second number is not greater than the second threshold). The seventh operation may be performed by means of the further processor 450, the processor 216, and/or the like.

In some embodiments, a first number of first pending data changes may be tracked. The first pending data changes may be the data changes of the records of data change 440$_i$ of the log files 430 stored on the first memory device 411 which are not yet replicated in the target table 420. In some embodiments, if the first number and the second number are tracked, the selecting may be based on the first number and the second number. In some embodiments, the first number may be determined by counting the records stored on the first memory device 411 from the record number of the last record of data change onwards to the youngest record of the youngest log file 430$_m$ of the first memory device 411. This may be the case when the last record of data change was read from the first memory device 411.

In some embodiments, the selecting of the type of data replication may involve performing a weighting of the first number and of the second number. For example, the weighting of the first number may be based on a first access time (e.g., access_time₁), and the weighting of the second number may be based on a second access time (e.g., access_time₂).

As an example, a weighted sum S of the first number $n_1$ and the second number $n_2$ may be calculated according to the following equation:

$$S = \text{access\_time}_1 * n_1 + \text{access\_time}_2 * n_2.$$

In some embodiments, the selection of the type of data replication may be performed such that the first type of data replication is selected if the weighted sum S is less than the fourth threshold, and the second type of data replication is selected if the weighted sum S is greater than or equal to the fourth threshold. In some embodiments, as an example, the fourth threshold may represent an approximated time for performing the updating of all rows of the target table 420 according to a second type of data replication. In another example, in some embodiments, the fourth threshold may be determined based on past experience, such as when a deadlock situation was reached or a situation close to a deadlock situation was reached. For example, the fourth threshold may be determined by calculating a further weighted sum, such as according to the formula given above, but using a further number of first and second pending data changes at the moment a deadlock situation or a situation close to a deadlock situation was reached, instead of using the first number $n_1$ and the second number $n_2$. In some embodiments, the fourth threshold may then be determined by multiplying the further weighted sum with a value between 0.1 and 0.9 to prevent the deadlock situation.

In some embodiments, an eighth operation may include replicating the data changes of the source table 410 in the target table 420 according to the selected type of data replication using the records of data change 440$_i$ of the log files 430. The eighth operation may be performed by means of the processor 216 and/or the like.

In some embodiments, the computer system 10 may be a standalone computer with no network connectivity that may receive data to be processed through a local interface. Such operation may, however, likewise be performed using a computer system that is connected to a network such as a communications network and/or a computing network.

Figure 3:
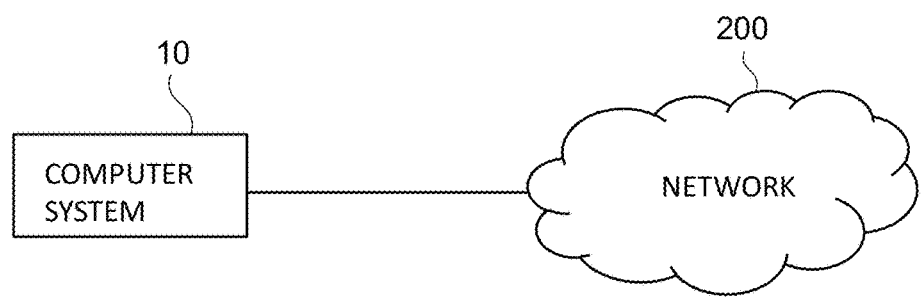
FIG. 3 depicts a network connected to the computer system of FIG. 1 in accordance with embodiments of the present invention.

FIG. 3 shows an exemplary computing environment where a computer system such as computer system 10 is connected to a network 200, for example, using a network adapter 20. Without limitation, the network 200 may be a communications network such as the Internet or other public network, a wide-area network (WAN), a local-area network (LAN), a wireless network such as a mobile communications network, and/or the like. The network 200 may comprise a computing network such as a cloud-computing network. The computer system 10 may receive data to be processed from the network 200 and/or may provide computing results to another computing device connected to the computer system 10 via the network 200.

In some embodiments, the computer system 10 may perform operations described herein, such as the first, second, third, fourth, fifth, sixth, seventh, and eighth operation, entirely or in part, in response to a request received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory and/or the like, using the network 200.

Figure 11:
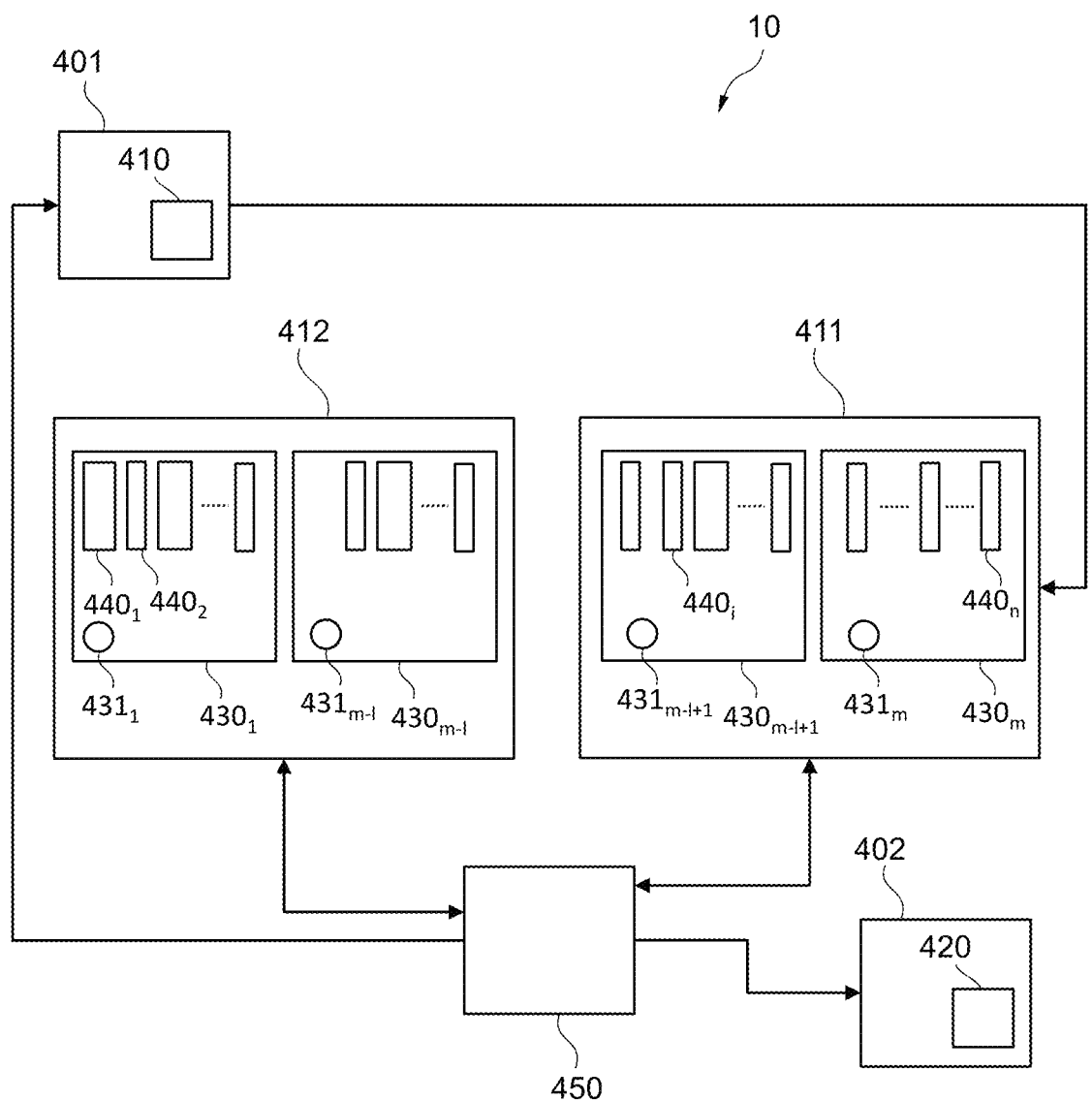
FIG. 11 depicts the source database system, the target database system, the first memory device, and the second memory device as shown in FIG. 4, the first and second memory device storing the log files as shown in FIG. 7, the log files each comprising a log number in accordance with embodiments of the present invention.

FIG. 11 shows an example of the computer system 10, where each log file $430_i$ may comprise a respective log number $431_i$, as shown in the form of a circle in FIG. 11. In some embodiments, the respective log number $431_i$ may indicate a total number of records of data change of the source table 410 having been generated until a respective moment when the generating of the respective log file $430_i$ is started. The respective log numbers $431_i$ may be included in the respective log files $430_i$ in the form of a respective header line. In the following example, it may be assumed that there are two log files stored on the first memory device 411, the first log file $430_1$ and a second log file $430_2$, and two log files are stored on the second memory device 412, a third log file $430_3$ and a fourth log file $430_m$. Thus, following this example m is equal to "4" and l is equal to "2". The log number $431_1$ of the first log file $430_1$ may be equal to "10", the log number $431_2$ of the second log file $430_2$ may be equal to "32", the log number $431_3$ (e.g., $431_{m-l+1}$) of the third log file $430_3$ may be equal to "42", and the log number $431_4$ (e.g., $431_m$) of the fourth log file $430_4$ may be equal to "112". The fourth log file $430_4$ may be the actual log file $430_m$ in this example.

The first number may be determined by calculating a difference between the log number assigned to the youngest log file $430_m$ of the first memory device 411, here log number $431_m$, and the log number $431_{m-l+1}$ assigned to the oldest log file $430_{m-l+1}$ of the first memory device 411. The first number may be determined in such a manner if the last record of data change is stored on the second memory device 412.

In some embodiments, the first number may be determined by calculating a difference between an actual total number of data changes of the source table 410 at an actual instant of time and the log number $431_{m-l+1}$ of the oldest log file $430_{m-l+1}$ of the first memory device 411. In some embodiments, the source database system 401 may include a counter for counting the actual total number of data changes of the source table 410 and may send the actual total number of data changes to the further processor 450, the target database system 402, and/or the like.

Furthermore, in some embodiments, using the log numbers $431_i$, the second number may be determined as a difference between the log number $431_{m-l+1}$ of the oldest log file $430_{m-l+1}$ of the first memory device 411 and the record number of the last record of data change. In this case, the last record of data change may be stored in one of the log files 430 being archived on the second memory device 412.

In addition, in some embodiments, using the log numbers $431_i$, the first number may be calculated as a difference between the log number $431_m$ of youngest log file $430_m$ of the first memory device 411 and the record number of the last record of data change. In this case, the last record of data change may be one of the records $440_i$ of the log files 430 being stored on the first memory device 411.

Figure 12:
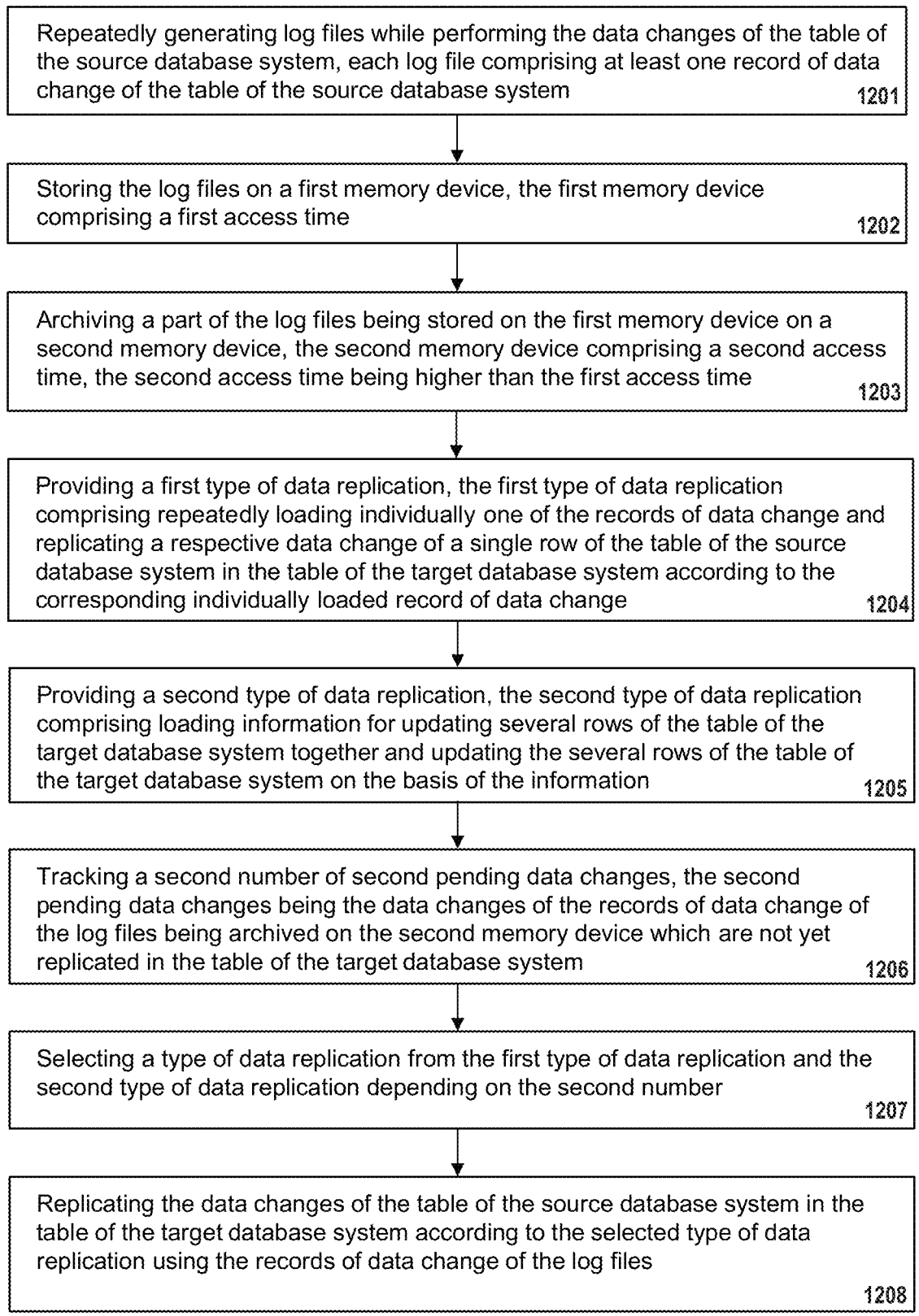
FIG. 12 depicts a flowchart of a computer implemented method for replicating data changes of the table of the source database system as shown in FIG. 5 in the table of the target database system shown in as FIG. 6 in accordance with embodiments of the present invention.

FIG. 12 shows a flowchart of a computer-implemented method for replicating data changes of the source table 410 in the target table 420 according to embodiments of the present invention.

In step 1201, the log files $430_i$ are repeatedly generated while performing the data changes of the table 410 of the source database system 401, each log file $430_i$ including at least one record of data change of the table 410 of the source database system 401.

In step 1202, the log files $430_i$ are stored on the first memory device 411, the first memory device 411 having a first access time.

In step 1203, a part of the log files $430_i$ being stored on the first memory device 411 are archived on a second memory device 412, the second memory device 412 having a second access time. The second access time may be higher than the first access time.

In step 1204, a first type of data replication may be provided.

In step 1205, a second type of data replication may be provided.

In step 1206, a second number indicating the number of the second pending data changes may be tracked.

In step 1207, a type of data replication may be selected from the first type of data replication and the second type of data replication depending on the second number and/or a first number.

In step 1208, the data changes of the source table 410 of the source database system 401 may be replicated in the target table 420 of the target database system 402 according to the selected type of data replication using the records of data change $440_i$ of the log files $430_i$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following, the invention will be described again by a list of clauses highlighting several possible, non-exclusive combinations of features disclosed herein.

Clause 1: A computer implemented method for replicating data changes of a table of a source database system in a table of a target database system, the method comprising: repeatedly generating log files while performing the data changes of the table of the source database system, each log file comprising at least one record of data change of the table of the source database system; storing the log files on a first memory device, the first memory device comprising a first access time; archiving a part of the log files being stored on the first memory device on a second memory device, the second memory device comprising a second access time, the second access time being higher than the first access time; providing a first type of data replication, the first type of data replication comprising repeatedly loading individually one of the records of data change and replicating a respective data change of a single row of the table of the source database system in the table of the target database system according to the corresponding individually loaded record of data change; providing a second type of data replication, the second type of data replication comprising loading information for updating several rows of the table of the target database system together and updating the several rows of the table of the target database system based on of the information; tracking a second number of second pending data changes, the second pending data changes being the data changes of the records of data change of the log files being archived on the second memory device which are not yet replicated in the table of the target database system; selecting a type of data replication from the first type of data replication and the second type of data replication depending on the second number; and replicating the data changes of the table of the source database system in the table of the target database system according to the selected type of data replication using the records of data change of the log files.

Clause 2: The method of clause 1, the method further comprising tracking a first number of first pending data changes, the first pending data changes being the data changes of the records of data change of the log files being stored on the first memory device which are not yet replicated in the table of the target database system, the selecting being dependent on the first number and the second number.

Clause 3: The method of clause 1 or 2, wherein loading the information for updating the several rows of the table of the target database system comprises loading several ones of the records of data change together, wherein updating the several rows of the table of the target database system comprises replicating data changes of several rows of the table of the source database system in the table of the target database system according to the loaded records of data change, each of the several rows of the table of the source database system corresponding to one of the several rows of the table of the target database system.

Clause 4: The method of clause 1 or 2, wherein loading the information for updating the several rows of the table of the target database system comprises loading data values of the several rows of the table of the source database system.

Clause 5: The method according to one of the previous clauses, wherein the selecting of the type of data replication comprises a weighting of the first number and the second number, the weighting of the first number being based on the first access time and the weighting of the second number being based on the second access time.

Clause 6: The method according to one of the previous clauses, the method further comprising selecting the first type of data replication if a ratio between the first number and the second number is greater than or equal to a third threshold and selecting the second type of data replication if the ratio between the first number and the second number is less than the third threshold, the ratio being a weighted ratio comprising where the first number is weighted based on the first access time and the second number is weighted based on the second access time.

Clause 7: The method according to one of the previous clauses, wherein the selecting type of data replication comprises calculating a weighted sum of the first number and the second number, the first number being weighted based on the first access time and the second number being weighted based on the second access time; selecting the first type of data replication if the weighted sum is less than a fourth threshold; and selecting the second type of data replication if the weighted sum is greater than or equal to the fourth threshold.

Clause 8: The method according to one of the previous clauses, wherein the second type of data replication comprises loading information for updating all rows of the table of the target database system together and updating all the rows of the table of the target database system based on of the information.

Clause 9: The method according to one of the previous clauses, the method further comprising using respective log numbers, each respective log number being assigned to a respective one of the log files, wherein each respective log number indicates a total number of records of data change of the table of the source database system having been written until a respective moment a generating of the respective log file is started, and wherein the tracking of the first number and the second number is based on the respective log numbers assigned to the log files.

Clause 10: The method according to one of the previous clauses, wherein the log files each include a respective log number, each respective log number being assigned to a respective one of the log files, where each respective log number indicates a total number of records of data change of the table of the source database system having been written until a respective moment a generating of the respective log file is started, and where the tracking of the first number and the second number is based on the respective log numbers of the log files.

Clause 11: The method of clause 9 or 10, wherein the tracking of the first number comprises calculating a difference between the respective log number assigned to the log file being stored the shortest time on the first memory device and the respective log number being assigned to the log file being stored the longest time on the first memory device.

Clause 12: The method of clause 9 or 10, wherein the tracking of the first number comprises calculating a difference between an actual total number of data changes of the table of the source database system at an actual instant of time and the respective log number assigned to the log file being stored the longest time on the first memory device.

Clause 13: The method according to one of the previous clauses, the method further comprising tracking a record number of the last record of data change being read out from the first memory device or the second memory device and used for a replication of a data change in the table of the target database system according to the last record of data change, and using the record number of the last record of data change for tracking the first number or the second number.

Clause 14: The method of clause 9 or 10 and 13, the method further comprising calculating the second number as a difference between the respective log number assigned to the log file being stored the longest time on the first memory device and the record number assigned to the last record of data change, where the last record of data change is included in one of the log files being archived on the second memory device.

Clause 15: The method of clause 9 or 10 and 13, the method further comprising calculating the first number as a difference between the respective log number assigned to the log file being stored the shortest time on the first memory device and the record number assigned to the last record of data change, where the last record of data change is included in one of the log files being stored on the first memory device.

Clause 16: The method according to one of the previous clauses, the method further comprising restoring the log files, where the restoring comprises storing the log files being archived on the second memory device on the first memory device.

Clause 17: The method of clause 16, the method further comprising performing the restoring based on respective sizes of the records of data change of the log files being archived on the second memory device.

Clause 18: The method of clause 9 or 10, the method further comprising counting the total number of records of data change of the table of the source database system using a counter; determining whether the counter is in a state that is close to an overflow of the counter; selecting the second type of data replication if the counter is in the state that is close to the overflow of the counter; and resetting the counter after replicating the data changes of the table of the source database system in the table of the target database system according to the second type of data replication using the records of data change of the log files; where the second type of data replication comprises loading all records of data change being stored on the first memory device and the second memory device together and replicating the data changes of more than one row of the table of the source database system in the table of the target database system according to all the loaded records of data change.

Clause 19: A computer program product comprising a computer-readable memory device having computer-readable program instructions embodied therewith, the computer-readable program instructions configured to implement the steps of the method according to any of the previous method clauses 1 to 18.

Clause 20: A computer system for replicating data changes of a table of a source database system in a table of a target database system, the computer system comprising the source database system and the target database system, the computer system being configured for: repeatedly generating log files while performing the data changes of the table of the source database system, each log file comprising at least one record of data change of the table of the source database system; storing the log files on a first memory device, the first memory device comprising a first access time; archiving a part of the log files being stored on the first memory device on a second memory device, the second memory device comprising a second access time, the second access time being higher than the first access time; tracking a second number of second pending data changes, the second pending data changes being the data changes of the records of data change of the log files being archived on the second memory device which are not yet replicated in the table of the target database system; selecting a type of data replication from the first type of data replication and the second type of data replication depending on the second number; and replicating the data changes of the table of the source database system in the table of the target database system according to the selected type of data replication using the records of data change of the log files.

Clause 21: The computer system of clause 20, wherein a first type of data replication comprises repeatedly loading each one of the records of data change individually and replicating a respective data change of a single row of the table of the source database system in the table of the target database system according to the corresponding individually loaded record of data change.

Clause 22: The computer system of clause 20, wherein a second type of data replication comprises loading information for updating several rows of the table of the target database system together and updating the several rows of the table of the target database system based on of the information.

Clause 23: A computing system for replicating data changes of a table of a source database system in a table of a target database system, the computer system comprising the source database system and the target database system, the computer system being configured to implement the steps of the method according to any of the previous method clauses 1 to 18.

What is claimed is:

1. A computer-implemented method comprising:
    repeatedly generating log files while performing data changes of a table of a source database system, each log file including:
        at least one record of data change of the table of the source database system; and
        a log number specifying a total number of records of data change of the table of the source database system having been written until generation of the respective log file;
    storing the log files on a first memory device, the first memory device having a first access time;
    archiving a part of the log files being stored on the first memory device on a second memory device, the second memory device having a second access time, wherein the second access time is higher than the first access time;
    tracking a first number of first pending data changes, first pending data changes being the data changes of the records of data change of the log files being stored on the first memory device which are not yet replicated in the table of the target database system;
    tracking a second number of second pending data changes, the second pending data changes being the data changes of the records of data change of the log files being archived on the second memory device which are not yet replicated in a table of a target database system;
    selecting a type of data replication from a first type of data replication and a second type of data replication based on the first number and the second number; and
    replicating the data changes of the table of the source database system in the table of the target database system according to the selected type of data replication using the records of data change of the log files.

2. The computer-implemented method of claim 1, wherein the first type of data replication includes loading individually each of the records of data change and replicating a respective data change of a single row of the table of the source database system in the table of the target database system according to a corresponding individually loaded record of data change.

3. The computer-implemented method of claim 1, wherein the second type of data replication includes loading information for updating several rows of the table of the target database system together and updating the several rows of the table of the target database system based on the information.

4. The computer-implemented method of claim 1, wherein the selecting of the type of data replication comprises a weighting of the first number and a weighting of the second number, wherein the weighting of the first number is based on the first access time and the weighting of the second number is based on the second access time.

5. The computer-implemented method of claim 1, the method further comprising:
    selecting the first type of data replication in response to a ratio between the first number and the second number being greater than or equal to a third threshold;
    wherein the ratio is a weighted ratio comprising the first number being weighted dependent on the first access time and the second number being weighted dependent on the second access time.

6. The computer-implemented method of claim 1, the method further comprising:
    selecting the second type of data replication in response to a ratio between the first number and the second number being less than a third threshold;
    wherein the ratio is a weighted ratio comprising the first number being weighted dependent on the first access time and the second number being weighted dependent on the second access time.

7. The computer-implemented method of claim 1, wherein the selecting of the type of data replication comprises:
calculating a weighted sum of the first number and the second number, the first number being weighted based on the first access time and the second number being weighted based on the second access time; and
selecting the first type of data replication if the weighted sum is less than a fourth threshold and selecting the second type of data replication if the weighted sum is greater than or equal to the fourth threshold.

8. The computer-implemented method of claim 1, wherein the tracking of the first number comprises calculating a difference between the respective log number assigned to the log file being stored a shortest time on the first memory device and the respective log number assigned to the log file being stored a longest time on the first memory device.

9. The computer-implemented method of claim 1, wherein the tracking of the first number comprises calculating a difference between an actual total number of data changes of the table of the source database system at an actual instant of time and the respective log number assigned to the log file being stored a longest time on the first memory device.

10. The computer-implemented method of claim 1, the method further comprising:
tracking a record number of a last record of data change being read out from the first memory device or the second memory device and used for a replication of a data change in the table of the target database system according to the last record of data change; and
using the record number of the last record of data change for tracking the first number or the second number.

11. The computer-implemented method of claim 10, the method further comprising calculating the second number as a difference between the respective log number assigned to the log file being stored a longest time on the first memory device and the record number assigned to the last record of data change, wherein the last record of data change is included in one of the log files being archived on the second memory device.

12. The computer-implemented method of claim 10, the method further comprising calculating the first number as a difference between the respective log number assigned to the log file being stored a shortest time on the first memory device and the record number assigned to the last record of data change, wherein the last record of data change is included in one of the log files being stored on the first memory device.

13. The computer-implemented method of claim 1, the method further comprising restoring the log files, the restoring comprising storing the log files being archived on the second memory device on the first memory device.

14. The computer-implemented method of claim 13, the method further comprising performing the restoring based on respective sizes of the records of data change of the log files being archived on the second memory device.

15. The computer-implemented method of claim 1, the method further comprising:
counting a total number of records of data change of the table of the source database system using a counter;
determining that the counter is in a state that is close to an overflow of the counter;
responsive to the counter being in the state that is close to the overflow of the counter, selecting the second type of data replication; and
resetting the counter after replicating the data changes of the table of the source database system in the table of the target database system according to the second type of data replication using the records of data change of the log files;
wherein the second type of data replication comprises loading all records of data change being stored on the first memory device and the second memory device together and replicating the data changes of more than one row of the table of the source database system in the table of the target database system according to all the loaded records of data change.

16. A computer program product comprising:
one or more computer readable storage media, wherein the one or more computer readable storage media are not transitory signals per se, and program instructions collectively stored on the one or more computer readable storage media, the program instructions comprising:
program instructions to repeatedly generate log files while performing data changes of a table of a source database system, each log file including:
at least one record of data change of the table of the source database system; and
a log number specifying a total number of records of data change of the table of the source database system having been written until generation of the respective log file;
program instructions to store the log files on a first memory device, the first memory device having a first access time;
program instructions to archive a part of the log files being stored on the first memory device on a second memory device, the second memory device having a second access time, wherein the second access time is higher than the first access time;
program instructions to track a first number of first pending data changes, first pending data changes being the data changes of the records of data change of the log files being stored on the first memory device which are not yet replicated in the table of the target database system;
program instructions to track a second number of second pending data changes, the second pending data changes being the data changes of the records of data change of the log files being archived on the second memory device which are not yet replicated in a table of a target database system;
program instructions to select a type of data replication from a first type of data replication and a second type of data replication based on the first number and the second number; and
program instructions to replicate the data changes of the table of the source database system in the table of the target database system according to the selected type of data replication using the records of data change of the log files.

17. A computer system comprising
at least one processor;
at least one computer readable storage medium;
a source database system; and
a target database system;
wherein:
the at least one processor is structured, located, connected, and programmed to run program instructions stored on the at least one computer readable storage medium; and the stored program instructions include:

program instructions programmed to repeatedly generate log files while performing data changes of a table of the source database system, each log file including:

at least one record of data change of the table of the source database system; and a log number specifying a total number of records of data change of the table of the source database system having been written until generation of the respective log file;

program instructions programmed to store the log files on a first memory device, the first memory device having a first access time;

program instructions programmed to archive a part of the log files being stored on the first memory device on a second memory device, the second memory device having a second access time, wherein the second access time is higher than the first access time;

program instructions programmed to track a first number of first pending data changes, first pending data changes being the data changes of the records of data change of the log files being stored on the first memory device which are not yet replicated in the table of the target database system;

program instructions programmed to track a second number of second pending data changes, the second pending data changes being the data changes of the records of data change of the log files being archived on the second memory device which are not yet replicated in a table of the target database system;

program instructions programmed to select a type of data replication from a first type of data replication and a second type of data replication based on the first number and the second number; and program instructions programmed to replicate the data changes of the table of the source database system in the table of the target database system according to the selected type of data replication using the records of data change of the log files.

\* \* \* \* \*